United States Patent
Bury et al.

(10) Patent No.: US 8,377,196 B2
(45) Date of Patent: *Feb. 19, 2013

(54) RHEOLOGY MODIFYING ADDITIVE FOR DRY CAST CEMENTITIOUS COMPOSITIONS

(75) Inventors: Jeffrey R. Bury, Auburn Township, OH (US); Lynn E. Brower, Solon, OH (US)

(73) Assignee: Construction Research & Technology GmbH (DE)

( * ) Notice: Subject to any disclaimer, the term of this patent is extended or adjusted under 35 U.S.C. 154(b) by 1110 days.

This patent is subject to a terminal disclaimer.

(21) Appl. No.: 12/188,669

(22) Filed: Aug. 8, 2008

(65) Prior Publication Data

US 2009/0197991 A1    Aug. 6, 2009

Related U.S. Application Data

(60) Provisional application No. 60/964,380, filed on Aug. 10, 2007.

(51) Int. Cl.
*C04B 24/00* (2006.01)

(52) U.S. Cl. ........ 106/696; 106/724; 106/726; 106/727; 106/729; 106/730

(58) Field of Classification Search .................. 106/724, 106/730, 696, 726, 727, 729
See application file for complete search history.

(56) References Cited

U.S. PATENT DOCUMENTS

| | | | | |
|---|---|---|---|---|
| 4,082,563 A * | 4/1978 | Ellis et al. | | 106/640 |
| 4,118,241 A * | 10/1978 | Bernett | | 524/4 |
| 4,402,752 A * | 9/1983 | Chesney, Jr. | | 106/720 |
| 4,501,617 A * | 2/1985 | Desmarais | | 524/5 |
| 4,573,534 A * | 3/1986 | Baker et al. | | 166/293 |
| 4,662,943 A * | 5/1987 | Baker et al. | | 106/720 |
| 4,676,832 A * | 6/1987 | Childs et al. | | 106/730 |
| 4,746,364 A * | 5/1988 | Kawai et al. | | 524/4 |
| 4,778,529 A * | 10/1988 | Barker et al. | | 106/726 |
| 5,234,968 A | 8/1993 | Debus et al. | | |
| 5,294,256 A * | 3/1994 | Weigand et al. | | 106/819 |
| 5,470,383 A * | 11/1995 | Schermann et al. | | 106/184.1 |
| 5,716,447 A | 2/1998 | Matsuo et al. | | |
| 5,728,209 A * | 3/1998 | Bury et al. | | 106/819 |
| 5,753,036 A * | 5/1998 | Hornaman et al. | | 106/810 |
| 5,814,146 A * | 9/1998 | Maggio et al. | | 106/802 |
| 6,106,603 A * | 8/2000 | Skaggs et al. | | 106/205.6 |
| 6,110,271 A | 8/2000 | Skaggs et al. | | |
| 6,117,226 A * | 9/2000 | Dial et al. | | 106/162.8 |
| 6,153,005 A | 11/2000 | Welker et al. | | |
| 6,267,814 B1 | 7/2001 | Bury et al. | | |
| 6,309,455 B1 * | 10/2001 | Skaggs et al. | | 106/205.6 |
| 6,461,425 B2 | 10/2002 | Brown et al. | | |
| 6,709,508 B2 * | 3/2004 | Dietrich et al. | | 106/724 |
| 6,800,129 B2 | 10/2004 | Jardine et al. | | |
| 6,811,605 B2 * | 11/2004 | Sasage et al. | | 106/805 |
| 7,501,021 B2 * | 3/2009 | Koyanagi et al. | | 106/708 |
| 7,621,995 B2 * | 11/2009 | Gray | | 106/724 |
| 7,909,927 B2 * | 3/2011 | Margheritis et al. | | 106/205.1 |
| 7,985,293 B2 * | 7/2011 | Sasage et al. | | 106/724 |
| 7,988,783 B2 * | 8/2011 | Waser et al. | | 106/823 |
| 2002/0045684 A1 | 4/2002 | Bacher et al. | | |
| 2002/0100394 A1 | 8/2002 | Lu | | |
| 2002/0121229 A1 * | 9/2002 | Jardine et al. | | 106/681 |
| 2004/0192788 A1 | 9/2004 | Smith et al. | | |
| 2005/0092209 A1 | 5/2005 | Garner | | |
| 2006/0100355 A1 | 5/2006 | Waser et al. | | |
| 2006/0281835 A1 | 12/2006 | Ong | | |
| 2007/0004826 A1 | 1/2007 | Bayer et al. | | |
| 2008/0156225 A1 | 7/2008 | Bury | | |

FOREIGN PATENT DOCUMENTS

| | | |
|---|---|---|
| EP | 0 458 328 | 11/1991 |
| FR | 1 447 298 A | 11/1966 |
| JP | 11 100247 | 4/1999 |
| WO | WO 03/106369 | 12/2003 |
| WO | WO 2004/024647 | 3/2004 |

OTHER PUBLICATIONS

International Preliminary Report on Patentability, Form PCT/IB/373, for PCT International Patent Application No. PCT/US2008/009534 corresponding to U.S. Appl. No. 12/188,669 mailed Feb. 16, 2010.
Office Action of the Canadian Intellectual Property Office, mailed Jan. 31, 2001, Application No. 2,671, 185.

* cited by examiner

*Primary Examiner* — Paul Marcantoni

(74) *Attorney, Agent, or Firm* — Curatolo Sidoti Co., LPA; Joseph G. Curatolo; Salvatore A. Sidoti

(57) ABSTRACT

A dry cast cementitious composition including cement, water, and a rheology modifying additive (RMA) is provided. The inclusion of the RMA improves the dry cast cementitious composition's response to vibration and dampens out differences due to minor fluctuations in initial slump of the composition. The RMA may include a dispersant for the dry cast cementitious compositions. The dry cast cementitious composition may optionally include other admixtures or additives known in the industry. Methods for making the dry cast cementitious composition and dry cast cementitious articles from the composition are also provided.

19 Claims, No Drawings

RHEOLOGY MODIFYING ADDITIVE FOR DRY CAST CEMENTITIOUS COMPOSITIONS

CROSS REFERENCE TO RELATED APPLICATIONS

This application claims the benefit of the filing date under 35 U.S.C. 199(e) from U.S. Provisional Application for Patent Ser. No. 60/964,380, filed on Aug. 10, 2007, which is hereby incorporated by reference in its entirety.

TECHNICAL FIELD

Disclosed is an admixture for a dry cast cementitious composition, a dry cast cementitious composition, a method of making a dry cast cementitious composition, and dry cast cementitious articles prepared from the dry cast cementitious composition. The dry cast cementitious composition comprising cement and the admixture exhibits improved response to vibration applied to the composition and results in improved cycle time and product finishability.

BACKGROUND

A cementitious dry cast mixture refers to pastes, mortars, and concrete compositions comprising a hydraulic cement binder having consistencies ranging from stiff to extremely dry as defined in ACI 211.3R-02, Table 2.1 (2007).

Pastes are defined as mixtures comprised of a hydraulic cement binder, either alone or in combination with pozzolans such as fly ash, silica fume, or blast furnace slag, and water. Mortars are defined as pastes that additionally include fine aggregate. Concretes additionally include coarse aggregate. These compositions may additionally include other admixtures such as set retarders, set accelerators, defoaming agents, air-entraining or air detraining agents, corrosion inhibitors, water reducing agents, pigments, and any other admixture to produce desired product performance properties.

Cementitious dry cast mixtures are used to form many articles, for example, concrete pipe, roof tile, masonry units, paver units, extruded plank, and any other preformed cementitious articles, in a mold or from an extrusion die. Each of these applications has basic desired characteristics that are critical in terms of producing quality finished units.

In masonry block applications, production speed, sufficient green strength, and the ability to resist slumping, sagging or deforming when stripped from the mold is important since stripping of the block from the mold occurs immediately after casting. The same is true for concrete pipe or roof tile with the additional desired property of improved surface appearance with reduced surface imperfections and reduced roller and/or die wear on equipment producing extruded pieces.

It is also desired to reduce the cycle time for the manufacture of a cementitious dry cast article. The reduction of cycle time reduces the cost of manufacture for each article and increases the number of articles that can be produced in a given period of time. Cycle time is defined as the time to complete one full cycle from the beginning of feed to the end, or next beginning of feed. The beginning of feed is when the dry cast mixture is fed from a collection hopper into the process. It is also desired to improve the compaction and consolidation of the cementitious dry cast mixture without altering the consistency of the mixture.

Green strength refers to the stability of the article in retaining its shape once the article is removed from the mold or extruder. Green strength depends, in part, on the consistency of the cementitious dry cast mixture, the amount of fines in the cementitious dry cast mixture, and the moldability of the cementitious dry cast mixture.

It is further desired to minimize the amount of water needed in a cementitious dry cast mixture to achieve consolidation and no sag or deformation in an article produced from the cementitious dry cast mixture.

A further limitation in the present art is the compressive strength of articles produced from cementitious dry cast mixtures. Early compressive strength is defined as the compressive strength achieved within 24 hours with or without steam cure. Compressive strength is determined by ASTM C-1176-2.

Known plasticizing admixtures for dry cast cementitious compositions often exhibit narrow ranges of performance where slight overdosing can create unworkable production mixtures, while slight underdosing can provide production problems in the manufacture of cementitious dry cast articles.

Additionally, many admixtures for dry cast cementitious compositions are formulated as oil-in-water emulsions and can be used as plasticizers in the production of dry cast cementitious articles. Oil-in-water emulsions, however, require either higher cost pre-emulsified starting raw materials or expensive production process. Furthermore, oil-in-water emulsions suffer from low product shelf-life, reduced environmental stability and increased susceptibility to microbial degradation.

During the production of dry cast articles, vibration energy is utilized to facilitate compaction and consolidation of the dry cast cementitious mixture. Due to the low workability of dry cast cementitious mixtures, however, generally high levels of vibration energy are required to properly and fully consolidate the mixture. When vibration is used, the paste fraction of the dry cast cementitious mixture liquefies providing a temporary increase in workability to the otherwise low workability mixture facilitating proper consolidation.

As the consolidation process continues, during the preparation of dry cast cementitious articles, large aggregate particles re-orient themselves such that more optimal packing occurs. The result of proper consolidation is a more uniform, void free material ensuring that the designed strength and durability of the dry cast article is achieved. Incomplete or improper consolidation can leave large voids or areas of honeycombing within the dry cast article leading to low compressive or flexural strengths, and poor surface finish.

What is needed in the industry is an additive for dry cast cementitious mixtures that operates over a wider effective dosage range, improves the mixture's response to vibration, and dampens out differences due to minor fluctuations from batch to batch. Improving the response to vibration would allow proper consolidation to be achieved with lower vibration energy, increased production or extrusion speed, and more consistent production of dry cast cementitious articles.

SUMMARY

Provided herein is a rheology modifying additive (RMA) for a cementitious composition. The RMA comprises a water soluble formulation that avoids the known problems encountered with the use of oil-in-water emulsion formulations. The RMA imparts increased compressive strength to the dry cast cementitious composition, improved compaction rate during the production of dry cast cementitious articles from the dry cast cementitious composition, improved texture of the dry cast cementitious composition, and improved appearance of hardened surfaces of article prepared from the dry cast cementitious composition.

According to certain embodiments, provided is a rheology modifying admixture (RMA) for a dry cast cementitious composition comprising an additive (A) capable of undergoing shear thinning in dry cast cementitious compositions in response to the application of energy to said dry cast cementitious composition and recovering viscosity in the absence of an application of energy to said cementitious composition; an additive (B) that does not undergo shear thinning when used alone in a dry cast cementitious composition in response to the application of energy to said dry cast cementitious composition, but when used in combination with additive (A), synergistically acts with additive (A) to further reduce the yield stress of said dry cast cementitious composition to which additives (A) and (B) are added.

According to certain embodiments, the RMA for dry cast cementitious mixtures further comprises a dispersant for said dry cast cementitious composition.

Additionally provided is a dry cast cementitious composition comprising hydraulic cement, water, and a rheology modifying additive (RMA), the RMA comprising (i) an additive (A) capable of undergoing shear thinning in dry cast cementitious compositions in response to the application of energy to said dry cast cementitious composition and recovering viscosity in the absence of an application of energy to said dry cast cementitious composition, (ii) an additive (B) that does not undergo shear thinning when used alone in a dry cast cementitious composition in response to the application of energy to said dry cast cementitious composition, but when used in combination with additive (A), synergistically acts with additive (A) to further reduce the yield stress of said dry cast cementitious composition to which additives (A) and (B) are added.

According to certain embodiments, the RMA further comprises a dispersant for said dry cast cementitious composition.

Further provided is a method of making a dry cast cementitious composition comprising mixing together hydraulic cement, water, and a rheology modifying additive (RMA) for said dry cast cementitious composition, wherein said RMA comprises (i) an additive (A) capable of undergoing shear thinning in dry cast cementitious compositions in response to the application of energy to said dry cast cementitious composition, and recovering viscosity in the absence of an application of energy to said dry cast cementitious composition, (ii) an additive (B) that does not undergo shear thinning when used alone in a dry cast cementitious composition in response to the application of energy to said dry cast cementitious composition, but when used in combination with additive (A), synergistically acts with additive (A) to further reduce the yield stress of said dry cast cementitious composition to which additives (A) and (B) are added.

According to certain embodiments of the process, the RMA further comprises a dispersant for said dry cast cementitious composition.

Further disclosed is a method for making a dry cast cementitious article comprising: providing a mixture comprising hydraulic cement, water, coarse aggregate, fine aggregate, and a rheology modifying admixture for a dry cast cementitious composition comprising an additive (A) capable of undergoing shear thinning in dry cast cementitious compositions in response to the application of energy to said dry cast cementitious composition and recovering viscosity in the absence of an application of energy to said cementitious composition; an additive (B) that does not undergo shear thinning when used alone in a dry cast cementitious composition in response to the application of energy to said dry cast cementitious composition, but when used in combination with additive (A), synergistically acts with additive (A) to further reduce the yield stress of said dry cast cementitious composition to which additives (A) and (B) are added; and forming the article from the mixture.

According to certain embodiments of the process, the RMA further comprises a dispersant for said dry cast cementitious composition.

DETAILED DESCRIPTION

Provided is an admixture for use with dry cast cementitious compositions to improve the response of the composition to vibration energy applied to the dry cast cementitious composition. The admixture formulation, which comprises a combination of certain functional chemistries in desired proportions, enhances production of dry cast cementitious articles and improves the visual appearance and hardened properties of the dry cast articles produced from the dry cast cementitious compositions containing the admixture formulation. The admixture formulation is soluble in water and therefore avoids the stability and production problems associated with traditional oil-in-water admixture formulations.

The rheology modifying additive (RMA) for dry cast cementitious compositions comprises an additive (A), an additive (B), optionally a dispersant for dry cast cementitious compositions, and optionally a liquid carrier. Additive (A) comprises an agent that is capable of undergoing shear thinning in dry cast cementitious compositions in response to the application of energy to the dry cast cementitious composition which results in a decrease in the viscosity of the composition, and which can recover viscosity in the absence of an application of energy to the cementitious composition. Additive (B) comprises an agent that typically does not undergo shear thinning when it is used alone in a dry cast cementitious composition in response to the application of energy to the dry cast cementitious composition, but when additive (B) is used in combination with additive (A), a synergistic RMA is provided that acts to further reduce the yield stress of the dry cast cementitious composition to which the RMA comprising the additives (A) and (B) are added. This synergistic RMA thereby improves the volume flow of dry cast cementitious compositions under shear conditions. The RMA includes the use of low levels of a certain additive (A) in combination with additive (B).

Additive (A) type materials are sometimes used in cementitious compositions to increase the viscosity of the mixture. Additive (A) of the RMA may comprise materials capable of high viscosity build in solution and that are resistant to alkaline pH degradation. Illustrative, but non-limiting examples of suitable additive (A) agents include polyalkylene oxides, certain polysaccharides, cellulose polymers, polyacrylic acids, polyacrylamides, starch, modified starch, and mixtures thereof.

According to certain embodiments, additive (A) comprises at least one polyalkylene oxide. Without limitation, suitable polyalkylene oxides include polyethylene oxide. Polyethylene oxides having molecular weights ranging from about 2,500 to about 4 million g/mol may be utilized in the admixture composition.

In other embodiments, additive (A) may comprise at least one polysaccharide. Without limitation, suitable polysaccharides include microbial polysaccharides. Illustrative examples of suitable microbial polysaccharides include welan gum, diutan gum, xanthan gum and mixtures thereof.

According to other embodiments, additive (A) may comprise at least one cellulose polymer, such as a cellulose ether. Suitable cellulose ethers comprise hydroxyalkyl cellulose, salts of carboxyalkyl cellulose, carboxyalkylhydroxyalkyl cellulose, hydroxyalkylhydroxyalkyl cellulose, and mixtures thereof. In certain embodiments, the cellulose ethers may comprise hydroxyethyl cellulose, sodium carboxymethyl cellulose, carboxymethylhydroxyethyl cellulose, hydroxymethylhydroxypropyl cellulose, and mixtures thereof.

According to other embodiments, the additive (A) included in the admixture for dry cast cementitious compositions comprises at least one polyacrylic acid. In the case that a polyacrylic acid is used as the additive (A) agent in the admixture composition, the polyacrylic acid may have a molecular weight of about 500,000 g/mol or greater.

In yet another embodiment, additive (A) comprises at least one polyacrylamide. Without limitation, a suitable polyacrylamide that may be included as additive (A) in the RMA for cementitious compositions is commercially available under the trade designation V-STAB 1/002.

Without intending to being bound to any particular theory, it is believed that the synergistic combination of at least one additive (A) and at least one additive (B) results in a RMA for dry cast cementitious compositions that alters the surface properties of solids that are in motion during the consolidation process in a dry cast cementitious composition, or that alters the properties of fluid between such solids. According to certain embodiments, the RMA may include one type of additive (A) and one type of additive (B). According to other embodiments, the RMA may include one type of additive (A) and more than one type of additive (B). According to further other embodiments, the RMA may include more than one type of additive (A) and one type of additive (B). According to yet further other embodiments, the RMA may include more than one type of additive (A) and more than one type of additive (B). Furthermore, a dispersant for dry cast cementitious compositions can be included in any of the above described embodiments.

Without limitation, additive (B) may be selected from alkyl aryl alkoxylates, alkyl alkoxylates, halogenated surfactants, anionic surfactants, such as cocamide diethanolamine, alkylbenzene sulfonic acid and alphaolefin sulfonate, cationic surfactants, nonionic surfactants, natural resins, such as vinsol resin, natural rosins, synthetic resins, synthetic rosins, ethylene oxide/propylene oxide block or random copolymers, a partially hydrolyzed polyvinyl alcohol, a fully hydrolyzed a polyvinyl alcohol, ethoxylated acetylenic diols, and mixtures thereof.

According to certain embodiments, additive (B) may comprise at least one of an alkyl aryl alkoxylate, such as nonyl phenol ethoxylate, including from about 2 to about 70 moles of ethylene oxide.

According to certain embodiments, additive (B) may comprise at least one of an alkyl alkoxylate, such as an alcohol ethoxylate including from about 2 to about 41 moles ethylene oxide.

According to certain embodiments, additive (B) comprises at least one of a halogenated surfactant. Without limitation, the halogenated surfactant may be selected from fluorinated surfactants. A suitable, but non-limiting, example of a fluorinated surfactant that may be included as an additive (B) in the RMA for cementitious compositions comprises a fluorinated surfactant commercially available from Chemguard Specialty Chemicals and Equipment under the trade designation FS-9090.

According to certain embodiments, additive (B) may comprise at least one of an ethylene oxide/propylene oxide block copolymer, such as those commercially available under the trademarks PLURONIC, PLURONIC R, TETRONIC and TETRONIC R, or ethylene oxide/propylene oxide random copolymers such as those commercially available from Huntsman under the trademark JEFFOX.

According to certain embodiments, additive (B) may comprise at least one of a partially hydrolyzed polyvinyl alcohol or fully hydrolyzed polyvinyl alcohol having a molecular weight from about 13,000 to about 126,000 g/mol. Suitable polyvinyl alcohols may also have molecular weights from about 13,000 to about 24,000 g/mol.

According to other embodiments, additive (B) may comprise at least one ethoxylated acetylenic diol having from about 20 to about 85 weight percent ethylene oxide content. Suitable ethoxylated acetylenic diols may also possess an ethylene oxide content from about 65 to about 85 weight percent. The ethoxylated acetylenic diols may possess about 20, 40, 65, 85 weight percent ethylene oxide content. An additional suitable acetylenic diol is DYNOL 604 that is commercially available from Air Products, Inc.

The ratio of additive (A) to additive (B) present in the RMA generally falls in the range of about 5:1 to about 1:15 parts by weight based on actives. According to certain embodiments, the ratio of additive (A) to additive (B) present in the admixture is in the range of about 1:1 to about 1:11 parts by weight based on actives.

According to certain illustrative embodiments, the admixture comprises diutan gum as additive (A) and a fully hydrolyzed polyvinyl alcohol as additive (B). According to other embodiments, the admixture comprises diutan gum as additive (A), a fully hydrolyzed polyvinyl alcohol as additive (B), and a polycarboxylate dispersant.

According to other illustrative embodiments, the admixture comprises polyethylene glycol as additive (A), ethoxylated nonylphenol as additive (B), and a polycarboxylate dispersant.

A dry cast cementitious composition is also provided. The dry cast cementitious composition comprises cement, water, and a rheology modifying additive (RMA). The RMA comprises a synergistic combination of an additive (A) and an additive (B). Additive (A) comprises an agent that is capable of undergoing shear thinning in dry cast cementitious compositions in response to the application of energy to the dry cast cementitious composition which results in a decrease in the viscosity of the composition, and which can recover viscosity in the absence of an application of energy to the dry cast cementitious composition. Additive (B) comprises an agent that typically does not undergo shear thinning when it is used alone in a dry cast cementitious composition in response to the application of energy to the dry cast cementitious composition, but when additive (B) is used in combination with additive (A), a synergistic RMA is provided that acts to further reduce the yield stress of the dry cast cementitious composition to which the RMA comprising the additives (A) and (B) are added.

According to certain embodiments, the RMA included in the dry cast cementitious composition further includes a dispersant for cementitious compositions.

The amount of additive (A) that is delivered to the dry cast cementitious composition by the RMA is in the range of about 0.0003 to about 0.025 weight percent actives based on the weight of the cementitious content. The amount of additive (A) delivered by the RMA to the dry cast cementitious composition may also be in the range of about 0.0003 to about 0.01 weight percent actives based on the weight of the cementitious content.

The amount of the at least one additive (B) delivered by the RMA to the dry cast cementitious composition is in the range of about 0.001 to about 0.05 weight percent actives based on the weight of the cementitious content. The amount of additive (B) delivered by the RMA to the dry cast cementitious composition may also be in the range of about 0.001 to about 0.03 weight percent actives based on the weight of the cementitious content. It should be noted that the amount of additive (B) delivered to the cementitious dry cast composition by the RMA may be delivered by only one type of additive (B). Alternatively, the amount of additive (B) delivered to the dry cast cementitious composition by the RMA may be delivered by a combination of more than one type of additive (B).

As used herein, the term cement refers to any hydraulic cement. Hydraulic cements are materials that set and harden in the presence of water. Suitable non-limiting examples of hydraulic cements include Portland cement, masonry cement, alumina cement, refractory cement, magnesia cements, such as a magnesium phosphate cement, a magnesium potassium phosphate cement, calcium aluminate cement, calcium sulfoaluminate cement, calcium sulfate hemi-hydrate cement, oil well cement, ground granulated blast furnace slag, natural cement, hydraulic hydrated lime, and mixtures thereof. Portland cement, as used in the trade, means a hydraulic cement produced by pulverizing clinker, comprising of hydraulic calcium silicates, calcium aluminates, and calcium ferroaluminates, with one or more of the forms of calcium sulfate as an interground addition. Portland cements according to ASTM C150 are classified as types I, II, III, IV, or V.

The dry cast cementitious composition may also include any cement admixture or additive including set accelerators, set retarders, air-entraining agents, air detraining agents, corrosion inhibitors, pigments, wetting agents, water soluble polymers, water repellants, fibers, dampproofing admixtures, gas formers, permeability reducers, pumping aids, fungicidal admixtures, germicidal admixtures, insecticidal admixtures, finely divided mineral admixtures, alkali-reactivity reducer, bonding admixtures, strength enhancing agents, shrinkage reducing agents, aggregates, pozzolans, dispersants and mixtures thereof.

Improvements to dry cast cementitious systems may be obtained by utilizing the rheology modifying additive alone or in combination with typical dispersants known in the industry such as lignosulfonates, naphthalene sulfonates, polycarboxylates, polyaspartates, or oligomeric dispersants.

The term dispersant is meant to include those chemicals that function as a plasticizer, water reducer, high range water reducer, fluidizer, antiflocculating agent, or superplasticizer for cementitious compositions, such as lignosulfonates (calcium lignosulfonates, sodium lignosulfonates and the like), salts of sulfonated naphthalene sulfonate condensates, salts of sulfonated melamine sulfonate condensates, beta naphthalene sulfonates, sulfonated melamine formaldehyde condensates, naphthalene sulfonate formaldehyde condensate resins, for example, LOMAR D® dispersant (Cognis Inc., Cincinnati, Ohio), polyaspartates, oligomeric dispersants, any other chemical that functions as a dispersant or water reducer or superplasticizer for cement, and mixtures thereof.

By way of illustration, and without limitation, examples of suitable polycarboxylate dispersants can be found in U.S. Pat. Nos. 6,267,814, 6,461,425, U.S. Ser. No. 09/371,627 filed on Aug. 11, 1999, U.S. Ser. No. 09/212,652 filed on Dec. 16, 1998, European Patent Application Publication EP753488, U.S. Pat. Nos. 5,158,996, 6,008,275, 6,136,950, U.S. Ser. No. 09/592,231 filed on Jun. 9, 2000, U.S. Pat. Nos. 5,609,681, 5,494,516; 5,674,929, 5,660,626, 5,668,195, 5,661,206, 5,358,566, 5,162,402, 5,798,425, 5,612,396, 6,063,184, and 5,912,284, 5,840,114, 5,753,744, 5,728,207, 5,725,657, 5,703,174, 5,665,158, 5,643,978, 5,633,298, 5,583,183, and 5,393,343, each of which are incorporated herein by reference.

Illustrative polycarboxylate dispersants that may be used in the admixture, the dry cast cementitious composition and the methods may include but are not limited to dispersants or water reducers sold under the trademarks RHEOMIX® and GLENIUM® (BASF Admixtures, Cleveland, Ohio), ADVA® (W. R. Grace Inc., Cambridge, Mass.), VISCOCRETE® (Sika, Zurich, Switzerland), and SUPERFLUX® (Axim Concrete Technologies Inc., Middlebranch, Ohio).

Oligomeric-type dispersants for cementitious compositions may also be utilized in the RMA, dry cast cementitious mixture and method. By way of illustration, and without limitation, suitable oligomeric dispersants are disclosed in U.S. Pat. Nos. 6,133,347, 6,492,461, and 6,451,881, each of which are hereby incorporated by reference.

Polyaspartate-type dispersants for cementitious compositions may also be utilized in the RMA, dry cast cementitious mixture and process. By way of illustration, and without limitation, suitable polyaspartate-type dispersants are disclosed in U.S. Pat. Nos. 6,136,950, and 6,284,867, 6,429,266, each of which are hereby incorporated by reference.

Listed below are several non-limiting examples of admixtures and additives that can be used with the present cementitious compositions. U.S. Pat. No. 5,728,209 to Bury et al., which is incorporated herein by reference, contains a detailed description of different types of admixtures.

The term air entrainer includes any chemical that will entrain air in cementitious compositions. Air entrainers can also reduce the surface tension of a composition at low concentration. Air-entraining admixtures are used to purposely entrain microscopic air bubbles into concrete. Air-entrainment dramatically improves the durability of concrete exposed to moisture during cycles of freezing and thawing. In addition, entrained air greatly improves a concrete's resistance to surface scaling caused by chemical deicers. Air entrainment also increases the workability of fresh concrete while eliminating or reducing segregation and bleeding. Materials used to achieve these desired effects can be selected from salts of wood resin; (Vinsol resin); some synthetic detergents; salts of sulfonated lignin; salts of petroleum acids; salts of proteinaceous material; fatty and resinous acids and their salts; alkylbenzene sulfonates; and salts of sulfonated hydrocarbons. Air entrainers are added in an amount to yield a desired level of air in a cementitious composition. Generally, the amount of air entrainers in a cementitious composition ranges from about 0.2 to about 5.0 fluid ounces per hundred pounds of cement. But this can vary widely due to variations in materials, mix proportion, temperature, and mixing action.

Retarding, or delayed-setting, admixtures are used to retard, delay, or slow the rate of setting of concrete. They can be added to the concrete mix upon initial batching or sometime after the hydration process has begun. Retarders are used to offset the accelerating effect of hot weather on the setting of concrete, or delay the initial set of concrete or grout when difficult conditions of placement occur, or problems of delivery to the job site, or to allow time for special finishing processes. Most retarders also act as water reducers and can also be used to entrain some air into concrete. Lignosulfonates, hydroxylated carboxylic acids, lignin, borax, gluconic, tartaric and other organic acids and their corresponding salts, phosphonates, certain carbohydrates and mixtures thereof can be used as retarding admixtures.

Air detrainers are used to decrease the air content in the mixture of concrete. Tributyl phosphate, dibutyl phthalate, octyl alcohol, water-insoluble esters of carbonic and boric acid, and silicones are some of the common materials that can be used to achieve this effect.

Alkali-reactivity reducers can reduce the alkali-aggregate reaction and limit the disruptive expansion forces in hardened concrete. Pozzolans (fly ash, silica fume), blast-furnace slag, salts of lithium and barium are especially effective.

Water-reducing admixtures are used to reduce the amount of mixing water required to produce concrete of a certain slump, to reduce the ratio of water and cement, or to increase slump. Typically, water reducers will reduce the water content of the concrete mixture by approximately up to 15%.

Superplasticizers are high-range water reducers, or water-reducing admixtures. Among the materials that can be used as superplasticizers are sulfonated melamine formaldehyde condensates, sulfonated naphthalene formaldehyde condensates, certain organic acids, lignosulfonates, and/or blends thereof.

Natural and synthetic admixtures are used to color concrete for aesthetic and safety reasons. These coloring admixtures are usually composed of pigments and include carbon black, iron oxide, phthalocyanine, umber, chromium oxide, titanium oxide and cobalt blue.

Corrosion inhibitors in concrete serve to protect embedded reinforcing steel from corrosion due to its highly alkaline nature. The high alkaline nature of the concrete causes a passive and noncorroding protective oxide film to form on the steel. However, carbonation or the presence of chloride ions from deicers or seawater can destroy or penetrate the film and result in corrosion. Corrosion-inhibiting admixtures chemically arrest this corrosion reaction. The materials most commonly used to inhibit corrosion are calcium nitrite, sodium nitrite, sodium benzoate, certain phosphates or fluorosilicates, fluoroaluminates, amines, organic based water repelling agents, and related chemicals.

Dampproofing admixtures reduce the permeability of concrete that have low cement contents, high water-cement ratios, or a deficiency of fines in the aggregate. These admixtures retard moisture penetration into dry concrete and include certain soaps, stearates, and petroleum products.

Gas formers, or gas-forming agents, are sometimes added to concrete and grout in very small quantities to cause a slight expansion prior to hardening. The amount of expansion is dependent upon the amount of gas-forming material used and the temperature of the fresh mixture. Aluminum powder, resin soap and vegetable or animal glue, saponin or hydrolyzed protein can be used as gas formers.

Permeability reducers are used to reduce the rate at which water under pressure is transmitted through concrete. Silica fume, fly ash, ground slag, natural pozzolans, water reducers, and latex can be employed to decrease the permeability of the concrete. Pozzolan is a siliceous or siliceous and aluminous material, which in itself possesses little or no cementitious value. However, in finely divided form and in the presence of moisture, pozzolan will chemically react with calcium hydroxide at ordinary temperatures to form compounds possessing cementitious properties.

Organic and synthetic polymers, organic flocculents, organic emulsions of paraffin, coal tar, asphalt, acrylics, styrene-butadiene copolymers, powdered lattices, pyrogenic silicas, natural pozzolans, fly ash and hydrated lime may also be added to a dry cast cementitious mixture which includes the RMA.

Bacteria and fungal growth on or in hardened concrete may be partially controlled through the use of fungicidal, germicidal, and insecticidal admixtures. The most effective materials for these purposes are polyhalogenated phenols, dialdrin emulsions, and copper compounds.

Other workability agents are water reducers and certain finely divided admixtures. Finely divided mineral admixtures are materials in powder or pulverized form added to the dry cast mixture before or during the mixing process to improve or change some of the hardened properties of portland cement concrete. Portland cement, as used in the trade, means a hydraulic cement produced by pulverizing clinker, consisting essentially of hydraulic calcium silicates, all usually containing one or more of the forms of calcium sulfate as an interground addition with ASTM types, I, II, III, IV, or V. The finely divided mineral admixtures can be classified according to their chemical or physical properties as: cementitious materials; pozzolans; pozzolanic and cementitious materials; and nominally inert materials. Cementitious materials are materials that alone have hydraulic cementing properties, and set and harden in the presence of water. Included in cementitious materials are ground granulated blast-furnace slag, natural cement, hydraulic hydrated lime, and combinations of these and other materials. As discussed above, pozzolan is a siliceous or aluminosiliceous material that possesses little or no cementitious value but will, in the presence of water and in finely divided form, chemically react with the calcium hydroxide released by the hydration of portland cement to form materials with cementitious properties. Diatomaceous earth, opaline cherts, clays, shales, fly ash, silica fume, volcanic tuffs and pumicites are some of the known pozzolans. Certain ground granulated blast-furnace slags and high calcium fly ashes possess both pozzolanic and cementitious properties. Natural pozzolan is a term of art used to define the pozzolans that occur in nature, such as volcanic tuffs, pumices, trasses, diatomaceous earths, opaline, cherts, and some shales. Nominally inert materials can also include finely divided raw quartz, dolomites, limestones, marble, granite, and others. Fly ash is defined in ASTM C-618.

In the construction field, many methods of strengthening cementitious materials have been developed through the years. One modem method involves distributing fibers throughout a fresh cementitious mixture. Upon hardening, this mixture is referred to as being fiber-reinforced. Fibers can be made of zirconium materials, steel, fiberglass, or synthetic materials, e.g., polypropylene, nylon, polyethylene, polyester, rayon, high-strength aramid, (i.e. KEVLAR®), or mixtures thereof.

The cementitious composition can also include fine aggregates, coarse aggregates, pozzolans, air (either entrapped or purposefully entrained), clay, and pigments.

The fine aggregates are materials that pass through a Number 4 sieve (ASTM C125 and ASTM C33), such as natural or manufactured sand. The coarse aggregates are materials that are retained on a Number 4 sieve (ASTM C125 and ASTM C33), such as silica, quartz, crushed round marble, glass spheres, granite, limestone, calcite, feldspar, alluvial sands, or any other durable aggregate, and mixtures thereof.

According to certain embodiments, a method of making a dry cast cementitious composition is provided. The method includes mixing together hydraulic cement, water, and a rheology modifying additive (RMA) comprising the above described additive (A) and additive (B) to form a dry cast cementitious composition.

Useful applications for the dry cast cementitious composition prepared with the addition of a rheology modifying additive (RMA) include extruded plank, cementitious roofing tile, concrete pipe, masonry block, segmental retaining wall units, concrete pavers, or any other dry cast cementitious article that can benefit from an improved response to vibration or improved surface finishability.

Production speeds for preparing dry cast cementitious articles can be increased, because the dry cast cementitious composition is more easily consolidated. Additionally, the use of the dry cast composition containing the RMA allows for consistent consolidation with lower vibration energy requirements.

EXAMPLES

The following examples are provided for the purpose of describing illustrative embodiments in greater detail. The following examples should not be construed as limiting the scope of the admixture, dry cast cementitious composition, or method for preparing the cementitious composition in any manner.

Cementitious dry cast mixtures in the following examples were proportioned and mixed according to normally accepted industry practices. The dry cast cementitious mixtures included cement, fly ash, sand, coarse aggregate, air entrainer, cement dispersant and either the RMA or a control admixture (Comparative Examples C2 and C5).

The mix proportions in the following examples were based on a 774 lb/batch total cementitious composition using a Type I Portland cement, fly ash, natural sand and coarse aggregate. Water contents were kept relatively constant within the set of mixes.

The microbial polysaccharide diutan gum was used as the additive (A) and polyvinyl alcohol was used as the additive (B). The air entrainer used in the examples is commercially available under the trademark PAVE-AIR™ from BASF Construction Chemicals, LLC—Admixture Systems (Cleveland, Ohio, USA). The dispersant used in the examples is commercially available as RHEOMIX® 750 S from BASF Construction Chemicals, LLC—Admixture Systems (Cleveland, Ohio, USA). A water repellent and efflorescence control admixture currently available as RHEOPEL® Plus from BASF Construction Chemicals, LLC—Admixture Systems (Cleveland, Ohio, USA) was used as the control in Comparative Examples C2 and C5.

The feed, finish and cycle times were measured for each of the inventive and comparative examples. Swipe, which is defined as surface effect on a cast article when the mold is removed, was also evaluated. Swipe was measured by visually evaluating the surface of the finished cementitious dry cast article for surface imperfections. Swipe is ranked from no swipe (0) to heavy swipe (5). The formulations of the cementitious compositions and test results are reported in Table 1 below.

TABLE 1

|  | 1 | C2 | 3 | 4 | C5 | 6 | 7 |
|---|---|---|---|---|---|---|---|
| Cement (lb.) | 658 | 658 | 658 | 658 | 658 | 658 | 658 |
| Fly Ash (lb.) | 116 | 116 | 116 | 116 | 116 | 116 | 116 |
| Sand (lb.) | 2022 | 2022 | 2022 | 2022 | 2022 | 2022 | 2022 |
| Coarse Aggregate (lb.) | 1866 | 1866 | 1866 | 1866 | 1866 | 1866 | 1866 |
| Water (% by wt.) | 8% | 7.8% | 7.7% | 8.05% | 7.95% | 7.85% | 8.1% |
| RMA (oz/cwt) | 3 | — | 5 | 3 | — | 5 | 5 |
| Water Repellant (oz/cwt) | — | 10 | — | — | 10 | — | — |
| Air Entrainer (oz/cwt) | 8 | 10 | 8 | 8 | 10 | 8 | 4.5 |
| Dispersant (oz/cwt) | 5.5 | 3.5 | 4 | 5.5 | 4 | 4 | 4 |
| Feed Time (sec) | 0.7 | 0.7 | 0.7 | 0.7 | 0.7 | 0.7 | 0.7 |
| Finish Time (sec) | 8-10 | 3.5-5 | 2.2-2.6 | 3-6 | 3-3.9 | 1.8-2.4 | 1.9-2.4 |
| Cycle Time (sec) | 10.7 | 12 | 9.4 | 11-17 | 10-14 | 8.9-9.3 | — |
| Swipe (1-5) | 5 | 5 | 5 | 5 | 5 | 5 | 5 |

Concrete blocks were prepared from the dry cast mixtures of Table 1. As shown in Examples 3 and 6, the addition of the RMA to a dry cast cementitious composition at a dosage of 5 oz/cwt reduces the average finishing time for making concrete block articles from 3.85 seconds to 2.22 seconds as compared to Comparative Examples C2 and C5. The addition of the RMA to the dry cast cementitious compositions also reduces the average cycle time from 12 seconds to 9.25 seconds as compared to Comparative Examples C2 and C5.

Further cementitious dry case mixtures were proportioned and mixed according to normally accepted industry practices. The dry case cementitious mixtures included 13.7% Portland cement-Type 1, 81.8% blended natural aggregate and 4.5% water. The cementitious compositions included cement dispersant alone (C8), additive (B) and cement dispersant but no additive (A)(C9 and C12), or the RMA including an additive (A), additive (B) and cement dispersant (10, 11, 13 and 14). The cementitious mixtures exhibited a void volume of 6.9% and a density of 141.9 lb/ft$^3$, as measured by ASTM C-140. The percent increase in compressive strength and compaction rate of each cementitious mixture was compared to the results for a plain cementitious mixture containing only cement, aggregate and water. The results are reported in Table 2.

TABLE 2

| Wt % additive | C8 | C9 | 10 | 11 | C12 | 13 | 14 |
|---|---|---|---|---|---|---|---|
| Dispersant | 0.08 | 0.08 | 0.08 | 0.08 | 0.08 | 0.08 | 0.08 |
| Additive A1 | — | — | 0.1 | — | — | 0.1 | — |
| Additive A2 | — | — | — | 0.1 | — | — | 0.1 |
| Additive B1 | — | 0.03 | 0.03 | 0.03 | — | — | — |
| Additive B2 | — | — | — | — | 0.03 | 0.03 | 0.03 |
| % increase compressive strength | 5 | 7 | 14 | 22 | 6 | 10 | 29 |
| % increase compaction rate | 29 | 52 | 58 | 58 | 37 | 51 | 53 |

Dispersant = polycarboxylate cement dispersant
Additive A1 = polyethylene glycol (mol. wt. = 3350 g/mol)
Additive A2 = polyethylene glycol (mol. wt. = 1 million g/mol)
Additive B1 = ethoxylated nonylphenol surfactant with 9.5 moles of ethoxylation
Additive B2 = SURFYNOL 465 surfactant Further cementitious dry case mixtures were proportioned and mixed according to normally accepted industry practices. The dry cast cementitious mixtures included 13.6% Portland cement-Type 1, 81.6% blended natural aggregate and 4.7% water. The cementitious compositions included an RMA including and additive (A), and additive (B) and cement dispersant (15), additive (A) and additive (B) but no cement dispersant (16), additive (A) and cement dispersant but no additive (B)(C17), additive (B) and a cement dispersant (C18), additive (A) only (C19), additive (B) only (C20), or cement dispersant (C21). The cementitious mixtures exhibited a void volume of 9.3% and a density of 135.5 lb/ft$^3$, as measured by ASTM C-140. The percent increase in compressive strength and compaction rate of each cementitious mixture was compared to the results for a plain cementitious mixture containing only cement, aggregate and water. The results are reported in Table 3.

TABLE 3

| Wt % additive | 15 | 16 | C17 | C18 | C19* | C20* | C21* |
|---|---|---|---|---|---|---|---|
| Additive A | 0.031 | 0.031 | 0.031 | — | 0.031 | — | — |
| Additive B | 0.031 | 0.031 | — | 0.031 | — | 0.031 | — |
| Dispersant | 0.019 | — | 0.019 | 0.019 | — | — | 0.19 |
| % increase compressive strength | 39 | 41 | 11 | 7 | 8 | 20 | 6 |
| % increase compaction rate | 64 | 67 | 23 | 13 | −3 | 37 | 5 |
| % increase initial density | 3.5 | 3.6 | 0.5 | 0.8 | −0.3 | 0.8 | 0 |

Additive A = polyethylene glycol (mol. wt. = 3350 g/mol)
Additive B = ethoxylated nonylphenol surfactant with 12 moles of ethoxylation
Dispersant = polycarboxylate cement dispersant
*= average over a 5 mix series It will be understood that the embodiments described herein are merely exemplary, and that one skilled in the art may make variations and modifications without departing from the spirit and scope of the invention. All such variations and modifications are intended to be included within the scope of the invention as described hereinabove. Further, all embodiments disclosed are not necessarily in the alternative, as various embodiments of the invention may be combined to provide the desired results.

The invention claimed is:

1. A rheology modifying admixture for a dry cast cementitious composition comprising:
at least one additive (A) capable of undergoing shear thinning in dry cast cementitious compositions in response to the application of energy to said dry cast cementitious composition and recovering viscosity in the absence of an application of energy to said dry cast cementitious composition, wherein additive (A) is selected from the group consisting of polyalkylene oxides, polysaccharides, cellulose polymers, polyacrylic acid, polyamides, starch, modified starch, and mixtures thereof; and
at least one additive (B) that does not undergo shear thinning when used alone in a dry cast cementitious composition in response to the application of energy to said dry cast cementitious composition, but when used in combination with additive (A), synergistically acts with additive (A) to further reduce the yield stress of said dry cast cementitious composition to which additives (A) and (B) are added, wherein additive (B) is selected from the group consisting of alkyl aryl alkoxylate, alkyl alkoxylate, halogenated surfactants, anionic surfactants, cationic surfactants, nonionic surfactants, natural resins, natural rosins, synthetic resins, synthetic rosins, ethylene oxide/propylene oxide block or random copolymers, partially hydrolyzed polyvinyl alcohol, fully hydrolyzed polyvinyl alcohol, ethoxylated acetylenic diols, and mixtures thereof,
wherein said additive (A) is present in amount from about 0.0005 percent to about 0.025 percent by weight of cementitious content, and
wherein said additive (B) is present in an amount from about 0.001 percent to about 0.05 percent by weight of cementitious content.

2. The admixture of claim 1, wherein said dispersant is selected from the group consisting of lignosulfonates, naphthalene sulfonates, melamine sulfonates, polycarboxylates, polyaspartates, oligomeric dispersants and mixtures thereof.

3. The admixture of claim 2, wherein said dispersant comprises a polycarboxylate dispersant.

4. The admixture of claim 1, wherein said additive (A) comprises a polyalkylene oxide.

5. The admixture of claim 4, wherein said polyalkylene oxide comprises polyethylene oxide.

6. The admixture of claim 5, wherein the weight average molecular weight of said polyethylene oxide is from about 2,500 to about 4 million g/mol.

7. The admixture of claim 1, wherein said additive (A) comprises a polysaccharide.

8. The admixture of claim 7, wherein said polysaccharide comprises a microbial polysaccharide.

9. The admixture of claim 8, wherein said microbial polysaccharide is selected from the group consisting of welan gum, diutan gum, xanthan gum and mixtures thereof.

10. The admixture of claim 1, wherein said additive (A) comprises a cellulose polymer.

11. The admixture of claim 10, wherein said cellulose polymer comprises a cellulose ether.

12. The admixture of claim 11, wherein said cellulose ether is selected from the group consisting of hydroxyalkyl cellulose polymers, carboxyalkyl cellulose polymers, salts of carboxyalkyl cellulose polymers, carboxyalkylhydroxyalkyl cellulose polymers, hydroxyalkyhydroxyalkyl cellulose polymers, and mixtures thereof.

13. The admixture of claim 1, wherein said additive (A) comprises polyacrylic acid having a weight average molecular weight of about 500,000 g/mol or greater.

14. The admixture of claim 1, wherein said additive (B) comprises a partially hydrolyzed polyvinyl alcohol or fully hydrolyzed polyvinyl alcohol having a weight average molecular weight from about 13,000 to about 126,000 g/mol.

15. The admixture of claim 14, wherein the weight average molecular weight of the partially hydrolyzed polyvinyl alcohol or fully hydrolyzed polyvinyl alcohol is from about 13,000 to about 24,000 g/mol.

16. The admixture of claim 1, wherein said additive (B) comprises an ethoxylated acetylenic diol comprising from about 20 percent to about 85 percent ethylene oxide content.

17. The admixture of claim 16, wherein the ethoxylated acetylenic diol comprises from about 65 percent to about 85 percent ethylene oxide content.

18. The admixture of claim 1, wherein said additive (A) comprises diutan gum and wherein said additive (B) comprises a fully hydrolyzed polyvinyl alcohol.

19. The admixture of claim 1, wherein said additive (A) comprises polyethylene glycol, said additive (B) comprises ethylated nonyl phenol, and wherein said admixture further comprises a polycarboxylate dispersant.

* * * * *